Feb. 10, 1953  R. M. TITUS  2,627,750
DIFFERENTIAL PRESSURE INDICATING DEVICE
Filed Jan. 24, 1947

INVENTOR.
ROBERT M. TITUS

George Lynn DeMott
ATTORNEY

Patented Feb. 10, 1953

2,627,750

UNITED STATES PATENT OFFICE 2,627,750

DIFFERENTIAL PRESSURE INDICATING DEVICE

Robert M. Titus, Enterprise, Oreg., assignor to The Bristol Company, Waterbury, Conn., a corporation of Connecticut Application January 24, 1947, Serial No. 724,013

5 Claims. (Cl. 73—407)

This invention relates to pressure responsive devices and especially to devices of the differential type.

Various schemes are known for measuring pressure differentials, but where the differentials are small and require instruments of extreme accuracy it is difficult to construct a device which is rugged without reducing its sensitiveness. The problem becomes acute where the differential pressure is of lower order than the absolute pressure, so that the use of thin fragile parts is necessary to adequate sensitiveness of the apparatus. The use of such parts, however, increases the susceptibility to damage to the instrument should it be subjected to a highly unbalanced pressure. The present invention aims to produce an instrument which is both rugged and sensitive, and to so construct the parts that failure of one of the opposing pressures can never cause damage to the pressure responsive elements of the device.

More particularly, the invention relates to a differential instrument in which two bellows elements subject to opposing pressures are used to produce a response to, or a measurement of, the difference in the pressures applied to the separate elements and to so construct and arrange the mechanism that the application of full pressure to one element, unopposed by pressure on the other element, will not damage the instrument or affect its sensitiveness or calibration. The results sought are achieved by use of the normal working parts of the device without the provision of valves, by-passes or extraneous parts such as are commonly utilized in seeking to achieve the purpose here sought.

The invention will be described in conjunction with the drawings, in which.

Figure 1:
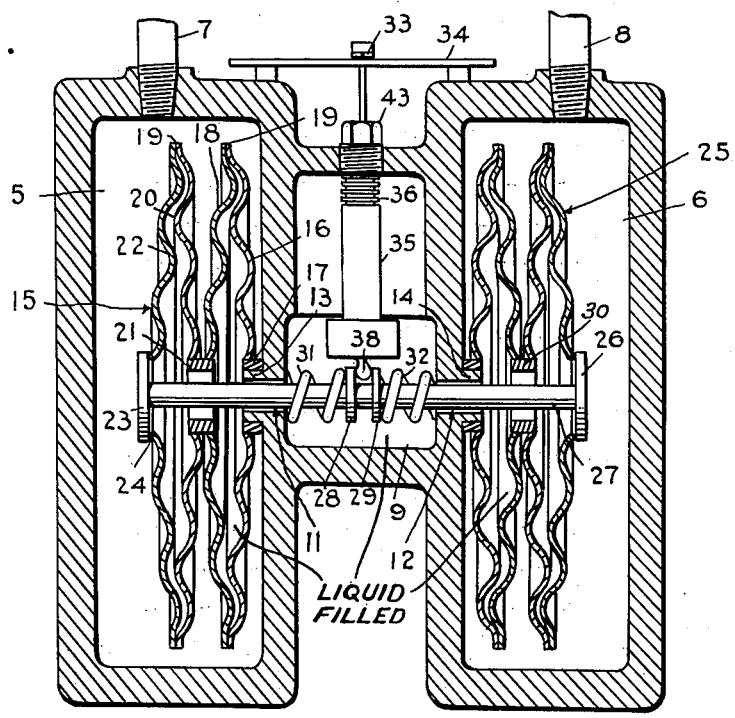
Figure 1 is a sectional view of one form of pressure responsive device embodying the invention.
Figure 2:
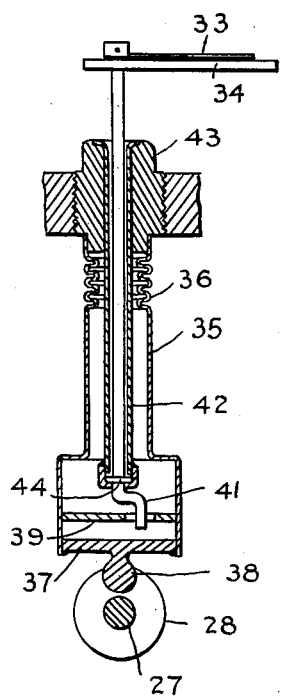
Fig. 2 is a detail sectional view of the indicating mechanism.
Figure 3:
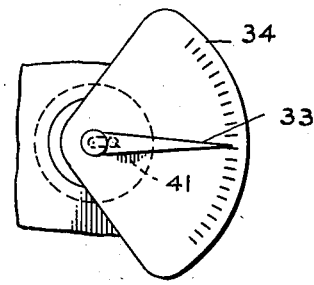
Fig. 3 is a plan view of the indicating mechanism.

Referring to the drawings, the reference characters 5 and 6 designate two chambers to which differential pressures may be applied as through lines 7 and 8. The chambers as shown form parts of a structure which includes an intermediate chamber 9 containing aligned openings 11 and 12. Before assembly of the instrument, these openings connect chamber 9 with the chambers 5 and 6 and they are bounded by annular flanges 13 and 14 projecting into the chambers 5 and 6.

Each of the chambers 5 and 6 contains a totally collapsible bellows element in sealed communication with a similar element in the other chamber. Chamber 5, for example, contains a bellows 15 made up of apertured flexible metal diaphragms, preferably corrugated to increase their flexibility and capable of nesting when collapsed. The innermost diaphragm 16 is sealed as by soldering to a ring 17 which is in turn sealed to flange 13. The periphery of diaphragm 16 is sealed to the adjacent diaphragm 18 as by soldering at 19. The central apertures in diaphragms 18 and 20 are sealed as by soldering to a ring 21 and diaphragm 22 is secured to a plate 23 as by soldering at 24. Thus, the diaphragms form a collapsible bellows which in collapsed position places the plate 23, ring 21 and flange 13 in abutting relation and the diaphragms nested together.

The bellows element 25 in chamber 6 is similar to the one just described, and hence need not be described in detail except to point out that it includes a plate 26 corresponding to plate 23, and an internal stiffening ring 30 corresponding to ring 21. The plate 26 on bellows 25 is rigidly connected to plate 23 on bellows 15 by a rod 27 passing through openings 11 and 12. As is obvious from an inspection of Fig. 1 of the drawing, the rod 27 passes through the bellows 15 and 25 and is attached to each of said bellows at the outer face thereof in the general plane of said outer face. Consequently, the bellows elements move in consonance but subject to opposing pressures, and the interiors of the bellows elements are connected with chamber 9. The space comprising the chamber 9 and the interiors of the bellows elements 15 and 25 is filled with an incompressible fluid, such as kerosene, preferably after they have been evacuated so as to remove the air or other gases from the space. As shown, the rod 27 is freely movable through the openings 11 and 12, but it will be practicable to restrict this movement in order to secure desired damping of the instrument by controlling the rate of liquid flow through these openings as one bellows collapses and the other expands.

While the pressure differential between pressures applied to bellows 15 and 25 may be utilized to actuate a responsive device of any sort, it may, and frequently will, be caused to actuate an indicator, hence an indicator has been illustrated.

In Fig. 1, 28 and 29 designate rings which are secured to rod 27 in spaced relation to each other. Springs 31 and 32, carried by rod 27 on each side of these rings, react against the walls of chamber 9 to keep the rod 27 centered when equal pressures obtain in chambers 5 and 6 and to restore it after displacement. Movement of the rod laterally causes movement of pointer 33 over scale 34 through any suitable means so long as chamber 9 is sealed. As shown, a flexible tube 35 has a bellows portion 36 at the top and terminates at the bottom in a plate 37 carrying a boss 38 which fits between the rings 28 and 29. The tube 35 is enlarged adjacent its lower end and contains an apertured plate 39. A crank 41 fits in the aperture in plate 39 and extends upwardly through tube 42 to needle 33. The crank carries an enlargement 44 journaled in the enlarged lower end of tube 42. Tube 42 is sealed to an opening in nut 43, and this nut is threaded into the top of chamber 9 and supports the top end of tube 35 which is sealed to it. In this way, chamber 9 is sealed and yet movement of rod 27 may cause actuation of needle 33 in either direction from its center while maintaining the seal. This linkage structure for actuating the indicator is disclosed and claimed in the patent to Hicks 2,441,882, dated May 18, 1948. The scale 34 may be calibrated in any units which are to be measured or indicated.

The operation of the device will be clear without detailed description, but it should be pointed out that the movement of rod 27 in either direction is limited, regardless of the pressure applied to either bellows. Movement of one bellows in a collapsing direction causes movement of the other in expansion until the collapse of the first is complete. Since the thrust applied to the collapsing bellows is distributed over the plates 23 and 26, rod 27 and supporting rings 21 and 30, it is obvious that highly unbalanced pressures have no damaging effects on the working parts of the device. The diaphragms may be made of extremely thin metal to afford maximum sensitiveness without danger of rupture should the pressure in either chamber 5 or 6 approach zero when that in the other is of normal value, or should one pressure greatly exceed the other so as to cause a dangerously high differential.

The arrangement shown is but one embodiment of the invention, and it will be obvious that other arrangements may be adopted utilizing the principles set forth herein without departing from the spirit and scope of the invention as defined in the appended claims.

Having thus described the invention, what is claimed is:

1. A differential pressure responsive device comprising a pair of opposed collapsible bellows each capable of nesting when collapsed, means for mounting said bellows in axial alignment with their adjacent ends in fixed sealed relation to each other and having a permanently unobstructed opening therein to provide between said bellows an enclosed space in free communication with the interior of said bellows for all positions of said bellows, means for applying different pressures to the outer surfaces of said bellows, means for indicating the difference between said pressures, a rigid member housed within said bellows and said enclosed space, said rigid member extending between and being connected to the outer faces of said bellows in the general plane of each outer face, whereby said rigid member is capable of movement as one bellows expands and the other contracts, and a body of incompressible liquid filling the otherwise unoccupied portions of said bellows and said enclosed space.

2. A differential pressure responsive device comprising a pair of aligned pressure chambers, means for supplying fluid pressure to said chambers independently, a collapsible bellows in each chamber, said bellows being made up of nestable diaphragms having central apertures bounded by reinforcing rings capable of abutting laterally when the bellows are collapsed, means forming a sealed chamber between said pressure chambers and connected with the interiors of both said bellows to permit free communication therebetween for all positions of said bellows, liquid means filling said sealed chamber and said bellows, a rod within said bellows, said rod extending between and being rigidly connected to the outer faces of said bellows in the general plane of each outer face whereby the rod is capable of movement through said sealed chamber as one bellows contracts and the other expands, an indicator for indicating the extent of movement of said rod when differential pressures are supplied to said pressure chambers, and an indicator-actuating means located in said sealed chamber in operative relation to said rod.

3. A differential pressure responsive device comprising a pair of aligned pressure chambers, means for supplying fluid pressure to said chambers independently, a collapsible bellows in each chamber, said bellows being made up of nestable diaphragms having central apertures bounded by reenforcing rings capable of abutting laterally when the bellows are collapsed, a sealed chamber between said pressure chambers, said sealed chamber being defined by walls having therein a pair of aligned openings, one of said openings connecting the interior of the sealed chamber with the interior of one bellows and the other of said openings connecting the interior of the sealed chamber with the other of said bellows, liquid means filling said sealed chamber and said bellows, a rod within said bellows and rigidly connected to both bellows at the outer faces of said bellows, said rod extending through the apertures of the bellows diaphragms and through the aligned openings connecting the bellows with the interior of the sealed chamber, the size of the diaphragm apertures being greater than the size of said aligned openings in the walls defining the sealed chamber and the size of said openings being greater than the size of the rod extending therethrough whereby there is communication between the interior of the sealed chamber and the interior of the bellows even when the bellows are completely collapsed.

4. A differential pressure responsive device comprising a pair of chambers each subject to fluid pressure, a bellows in each chamber, said bellows being completely collapsible whereby the bellows can withstand without damage the absolute pressure applied to its chamber without opposition from the pressure applied to the other chamber, a sealed chamber isolated from said pressure chambers and connecting the interior spaces of said bellows and having free communication with the interiors of said bellows in all positions of the same, liquid means filling said sealed chamber and the interiors of said bellows, an indicator located exterior to said chambers, an actuating shaft extending from said indicator into the interior of said sealed chamber, means located in said sealed chamber and responsive to the movement of the two bellows for moving said actuating shaft, and seal means enclosing said actuating shaft and isolating said shaft from the liquid means in said sealed chamber.

5. A differential pressure responsive device comprising a pair of aligned pressure chambers, means for supplying fluid pressure to said chambers independently, a collapsible bellows in each chamber, said bellows being made up of nestable diaphragms having central apertures bounded by reenforcing rings capable of abutting laterally when the bellows are collapsed, a sealed chamber being defined by walls having a pair of aligned openings therein, said openings extending from the interior of the sealed chamber to the interior of each bellows, liquid means filling said sealed chamber and said bellows, a rod within said bellows and rigidly connected to both said bellows at the outer faces of said bellows, said rod extending through the apertures of said bellows diaphragms and through the aligned openings connecting the sealed chamber to the bellows interiors, said diaphragm apertures being larger than the aligned openings and the aligned openings being larger than the rod whereby there is communication between the sealed chambers and the bellows interiors for all positions of the bellows, an indicator for indicating the extent of movement of said rod when differential pressures are supplied to said pressure chambers, said indicator being located exterior to said sealed chamber, an actuating shaft extending from said indicator into the interior of said sealed chamber, sealing means enclosing said actuating shaft and isolating it from the liquid means in said sealed chamber, and means including said sealing means for moving said actuating shaft in response to movement of said rod.

ROBERT M. TITUS.

REFERENCES CITED

The following references are of record in the file of this patent:

UNITED STATES PATENTS

| Number | Name | Date |
|---|---|---|
| 2,400,048 | Jones | May 7, 1946 |
| 2,441,882 | Hicks | May 18, 1948 |
| 2,497,255 | Brown | Feb. 14, 1950 |

FOREIGN PATENTS

| Number | Country | Date |
|---|---|---|
| 292,859 | Great Britain | June 28, 1928 |
| 387,902 | Great Britain | Feb. 16, 1933 |